Sept. 20, 1966 S. ENGLESSON 3,273,276

LIVE FISH STORAGE AND TRANSPORT DEVICE

Filed Jan. 14, 1965

INVENTOR:
SIXTEN ENGLESSON,
BY

HIS ATTORNEY.

United States Patent Office 3,273,276
Patented Sept. 20, 1966

3,273,276
LIVE FISH STORAGE AND TRANSPORT DEVICE
Sixten Englesson, Djursholm, Sweden, assignor of one-half to AB Flygts Pumpar, Solna, Sweden
Filed Jan. 14, 1965, Ser. No. 425,506
1 Claim. (Cl. 43—6.5)

This is a continuation-in-part of my application Ser. No. 268,402, filed March 27, 1963, now abandoned.

The invention relates to fishing, and relates more particularly to a device for the storage and transport of live fish.

It is accordingly among the principal objects of the invention to provide means for storing fish alive from the time when the fish is caught in the fishing implement until the catch is landed, without any necessity of making use of the storage space of the fishing-vessel or trawler itself.

It is a further object of the invention to provide storage means that may be used for transporting the fish to the landing port. Said transporting can be carried out by the fishing-vessel at a suitable opportunity or by special transport-vessels.

It is a further object of the invention to provide a fishing and storing mechanism for live fish which includes a fishing implement for live fish and the aforesaid fish storage and transporting device detachably connected thereto.

Further object and advantages of the invention will be set forth in part in the following specification and in part will be obvious therefrom without being specifically referred to, the same being realized and attained as pointed out in the claims hereof.

The instant invention offers the advantage to utilize the time on the fishing-vessel in a more efficient way and take advantage of the favorable catch opportunities when fish are plentiful.

It is a further advantage of the invention that the fishing-vessel will be more seaworthy and navigable, as it does not need to take on any cargo.

A device according to the invention for the storage of living fish is adapted to be used in connected with fishing implements, such as trawls, seines or the like. For example, from a fishing implement, such as a trawl, a suction line leads to a pumping device and from said pumping device to a gathering place for the catch of fish dragged by the liquid flow through said suction line. In a seine, on the other hand, a corresponding line may be lowered within the closed seine.

For serving the above purpose, the device according to the invention is characterized by the fact that the collecting place for the catch of fish drawn up by pumping comprises a preferably elongated container floating at the surface of the sea and being made of flexible material and provided with limited openings in one or more of its walls and to which container the outlet from the pump line is detachably connected in such a way that, when removing the pump line, the connection opening is blocked up for preventing the fish to pass therethrough.

The water pumped into the container with the catch passes out from the container through said limited openings, for instance perforations at the end of the container opposite to that provided with the inlet.

Preferably, the pumping device for supplying the fish to the container is made as a separate floating unit, to which said storage container can be connected. The pump device can, however, be arranged in other manners, such as rigidly or swingably secured to the hull of the fishing-vessel.

When using the device according to the invention it is possible to fill a number of containers necessary for taking up the whole catch, which containers may then be left floating for towing the same to the landing port later on. In order to find easily the filled containers, the latter are suitably provided with securing means for identification signs, such as flags.

In order to obtain a signal when the container is just filled enough, a flexible sheet or net is provided within the elongated container and is secured to the same so as to extend diagonally between the ends of the container so that the net forms a perforated wall between the inlet and outlet of the container. The rear wall of the container is perforated while an end portion of the net is generally closed and is dimensioned so that it can engage the perforated rear wall of the container substantially to prevent further throughflow of the water, which is immediately observed at the inlet opening by the person attending to the filling of the container. Of course, the end of the net need not completely close or entirely close the perforated rear wall of the container, but the aim is to provide for a sufficient choke in order to obtain a damming up and overflow at the inlet. The restriction at the rear wall of the container is suitably such that when the container is floating or towed in the sea, a sufficient exchange of water for keeping the fish alive and in good condition is assured. For this purpose a restricted opening provided with a lattice or a net is provided at the inlet side of the container.

The container suitably consisting of a plastic material can be provided with inflatable or air-filled chambers. The inflation can be carried out either from a compressed gas source on the vessel laying out the container or from a compressed air cartridge or the like supported by the container. The chambers can also be such that they have an inherent expansivity by the resilient condition of the material or by auxiliary means and the chambers are provided with return valves permitting air to enter into the chambers, so that the chambers will be automatically filled, for instance when the container is unrolled from a state in which the container is, as for example rolled up about a cylindrical lattice furnished with a bottom. The container can also be irregularly shaped so that air pockets are formed for keeping the container floating in the sea.

In the following, certain embodiments of the invention art described with reference to the annexed drawing.

Figure 1:
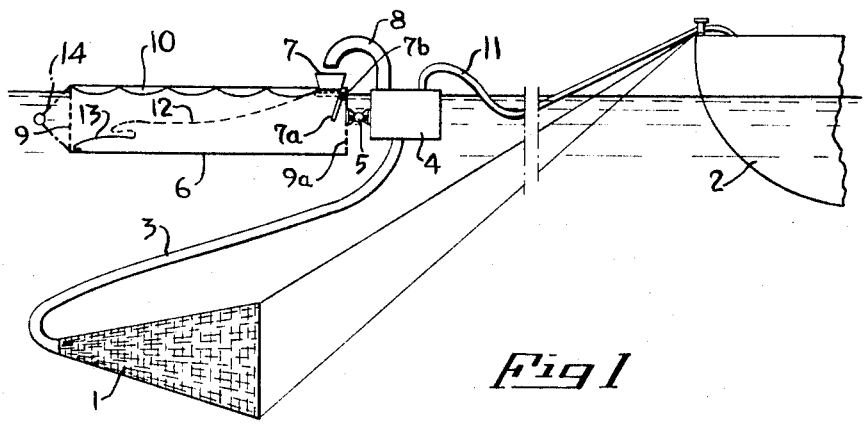
FIG. 1 is a schematic elevational view of a fishing implement connected to a storage device according to the invention, the storage container of said device being shown in section.

In FIG. 1 the numeral 1 designates a trawl laid out from a vessel 2. From the trawl 1 a suction line 3 leads to a floating pump device 4 detachably coupled at a bracket 5 to a container 6 of soft, flexible material. The bracket, as pointed out below may, however, also be used for fastening a tow line thereto. In the embodiment shown, the container 6 is provided with an upwardly directed, suitably hopper-shaped intake opening 7 above which a tube 8 from the pump device 4 discharges, so that it is possible to observe if fishes follow with the flow of water. The flow of water charged into the container 6 passes longitudinally through the same and discharges therefrom at its opposite end provided with a latticed wall or a net wall 9. The container 6 has air chambers 10 which the floating means that act to render the container 6 afloat; as indicated below, however, other floating means may be provided for keeping the container 6 afloat.

A valve plate 7a is hinged at 7b inside the container. The plate 7a is made of lightweight material, such as foamed plastic, to float and serves to prevent the escape of fish from the container 6. When filling the container 6 with fish, the plate 7a will be forced down from its floating closed position just below the opening 7 (shown in broken lines in FIG. 1 and in solid lines in FIG. 2) into an open position at an angle thereto (shown in solid lines in FIG. 1 and in broken lines in FIG. 2). When the container 6 is filled with fish, however, the plate 7a will close the opening 7. To empty the container 6, the plate 7a may be forced open by means of a pipe 16a of the type shown in FIG. 3, and the container 6 may be turned around and be emptied through the opening 7 and the pipe 16a that has been introduced thereinto.

The pump device 4 can be driven electrically or hydraulically or in any other suitable way from its own driving source or from a driving source on the vessel, as is suggested by a conduit 11 which connects a driving source on the vessel with a pump device 4 or supplies fuel or energy to a driving motor provided in the pump device 4 itself.

Figure 2:
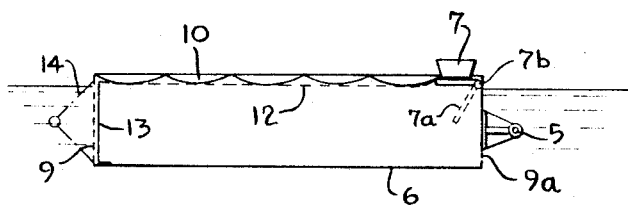
FIG. 2 is a schematic elevational view of the container in FIG. 1, in filled condition.

In order to indicate when the container is filled, a net or similar perforated sheet material 12 may be arranged in such a manner in the container 6 that it forms a partition wall in the container between its intake and outlet openings 7 and 9. Said partition wall can be brought to engage tightly the inner wall of the container 6. The net 12 can be shaped as a bag fastened at its fore edge or consist of a broad net-strip fastened along the inner sides of the container 6 and preferably extending diagonally downwardly towards the latticed outlet-openings 9. The end portion 13 of the net located at said latticed end of the container 6 is impervious or is provided with a small number of openings of limited area. Said portion 13 of the net 12 covers, when it engages the walls of the container 6, the latticed openings 9 and prevents or obstructs further outflow from the container which makes itself noticeable at the inlet 7 and indicates that the container 6 is full. This condition is shown in FIG. 2. Said net 12 is not substantially influenced by the flow of water pumped into the container when filling the same with fish. But when the container is filled with fish, said net is brought to its position shown in FIG. 2 and thus by its impervious part 13 closes the latticed openings 9 (FIG. 2) sufficiently for bringing about a flow back of the water pumped into the container through the inlet opening 7, and thus closes the valve plate 7a. The openings 9a at the other end of the container 6 are too small to upset this flow back appreciably.

The container 6 is not packed with fish, but merely filled, as the fish must be alive and have the possibility to swim. When the filled container is to be towed, this can be done in a selected direction (by connecting the towing-line either to the bracket 5 or 14, in FIG. 2). When the container is moved, the water tends to flow into the container 6 through the latticed openings 9a at one end of the container and the entered water can flow out through the latticed openings 9 at the opposite end of the container. The net 12 is closing the openings 9 not sufficiently to prevent such gentle throughflow.

Figure 3:
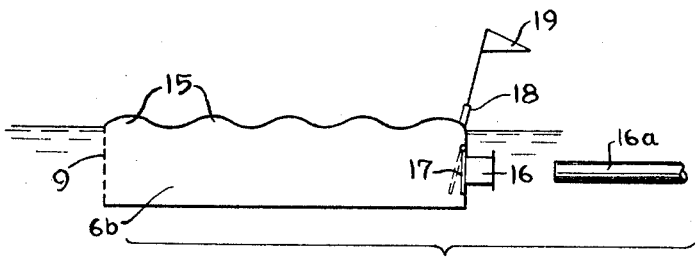
FIG. 3 is a schematic elevational view of a modified container according to the invention.

In FIG. 3, a modified embodiment of the invention is shown where the container has modified floating means, namely, a wave-shaped upper side in order to form a series of open air filled pockets 15. A net (not shown) similar to the net 12 of FIGS. 1 and 2 may be used. The connection between the pump device and the container is shown as a tube fitting 16 that may in any suitable conventional manner (not shown in the drawing) be connected to the end of the pump conduit to receive the stream of fish. The fitting 16 is provided with a valve plate 17 that is normally in closed position and is forced into the open position by the pumped stream that enters into the container 6b through the fitting 16.

During towing, the water may enter into the container 6b through latticed openings similar to the openings 9a (though not shown in FIG. 3) and leave through the latticed openings 9; for discharging the fish, the valve plate 17 may be pressed open, for instance by introducing, like for the plate 7a, the separate pipe 16a through the fitting 16. The fish may then either be pumped out or, if the container is already landed, it may be emptied through the said pipe end by raising the end of the container opposite the outlet opening.

It is to be noticed that the floating means can also consist of cellular plastic or similar material.

A bracket 18 is provided for a flag 19 serving as a marking for finding the filled container when it is to be towed to the landing port.

At the landing of the fish the catch of living fish can either be pumped directly from the container or the whole container may be lifted, for instance, by aid of a "cradle" and emptied in a transport chute.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

A live fish storage and transport device, for use in connection with a fishing implement having means for catching fish and pumping them in a water stream to said device and adapted to be detachably connected to said device, said device comprising an elongated container including floating means and composed of flexible material and due said floating means floating at the sea surface and having an inlet adapted to receive the pumped stream of fish, and having front and rear walls defining restricted openings being sufficiently large to pass water and sufficiently narrow to block the passage of fish, enabling a restricted flow of sea water through said container, and valve means disposed adjacent said inlet opening and operable to restrain releasably the passage of fish into and out of said container, a flexible sheet disposed inside said container and having perforated portions adapted to pass water but to reject fish and near the rear wall a rear portion corresponding to the rear wall of the container and being substantially impervious to the passage of water, said sheet being connected to the interior of the container and disposed diagonally therein to the rear of said inlet, said sheet in the empty container normally remaining in an inactive slackened position and being operable to be moved upwardly and rearwardly into an active position by the fish entering into said container below said sheet, said rear portion in the active position lining the rear wall of the container, said sheet thereby substantially blocking the openings thereof to the passage of water, whereby the flow of sea water through the rear end of said container will be substantially prevented.

References Cited by the Examiner

UNITED STATES PATENTS

| 1,447,553 | 3/1923 | Hudson | 43—6.5 |
| 1,745,251 | 1/1930 | Enright | 43—6.5 |
| 1,788,255 | 1/1931 | Thomas | 43—55 |
| 2,657,496 | 11/1953 | Spotswood | 43—55 |
| 2,672,987 | 3/1954 | Hutchinson. | |

OTHER REFERENCES

German printed application M 12,756, October 1955.

SAMUEL KOREN, *Primary Examiner.*

W. H. CAMP, *Assistant Examiner.*